United States Patent Office.

DAVID HESS, OF PITTSBURG, PENNSYLVANIA.

Letters Patent No. 62,331, dated February 26, 1867.

IMPROVEMENT IN WASHING FLUID.

*The Schedule referred to in these Letters Patent and making part of the same.*

TO ALL WHOM IT MAY CONCERN:

Be it known that I, DAVID HESS, of Pittsburg, county of Allegheny, and State of Pennsylvania, have invented a new and useful "Washing Fluid;" and I do hereby declare the following to be a clear and exact description of the mixture:

To three gallons of soft water I add two and one-half pounds of soda ash, and one-half pound of slaked lime, and boil the same one hour. While cooling I add one gill of alcohol, one ounce of spirits of ammonia, and one ounce of dissolved borax. I then use the fluid as follows:

Soak, say six dozen pieces, large and small, over night, or, if in a hurry, just wet; wring out, soaping as usual; then put the clothes on to boil in the usual quantity of water, adding a half a pint of the fluid.

This fluid will neither rot, stain, discolor, nor in any respect harm any kind of clothing. I use in the proportion of one-half pint of the fluid to six dozen articles, making a very cheap and useful article.

What I claim as my invention, and desire to secure by Letters Patent, is—

The combination of ingredients in the proportions as herein described, and for the purposes set forth.

DAVID HESS.

Witnesses:
JACOB H. WALTER.
J. J. SHUTTERLY.